(12) United States Patent
Chen et al.

(10) Patent No.: US 10,686,171 B2
(45) Date of Patent: Jun. 16, 2020

(54) BATTERY MODULE

(71) Applicant: CONTEMPORARY AMPEREX TECHNOLOGY CO., LIMITED, Ningde (CN)

(72) Inventors: Zhiming Chen, Ningde (CN); Lin Ma, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 257 days.

(21) Appl. No.: 15/730,489

(22) Filed: Oct. 11, 2017

(65) Prior Publication Data
US 2018/0108888 A1 Apr. 19, 2018

(30) Foreign Application Priority Data

Oct. 19, 2016 (CN) .......................... 2016 1 0910232

(51) Int. Cl.
*H01M 2/10* (2006.01)
*H01M 10/04* (2006.01)
(Continued)

(52) U.S. Cl.
CPC ..... *H01M 2/1077* (2013.01); *H01M 10/0413* (2013.01); *H01M 10/0486* (2013.01); *H01M 10/647* (2015.04); *H01M 10/658* (2015.04)

(58) Field of Classification Search
CPC ........... H01M 2/1077; H01M 10/0486; H01M 10/0413; H01M 10/658; H01M 10/647; H01M 10/6554; H01M 10/613
See application file for complete search history.

(56) References Cited

U.S. PATENT DOCUMENTS

| 2010/0136385 A1 | 6/2010 | Hermann et al. |
| 2010/0183910 A1 | 7/2010 | Nishino et al. |

(Continued)

FOREIGN PATENT DOCUMENTS

| CN | 102117945 A | 7/2011 |
| CN | 102356483 A | 2/2012 |

(Continued)

OTHER PUBLICATIONS

Lin Qilang et al, Direct preparation of carbon foam by pyrolysis of cyanate ester resin at ambient pressure, JAAP, vol. 104, No. 10, 2013, p. 714-717.

(Continued)

*Primary Examiner* — Lisa S Park
(74) *Attorney, Agent, or Firm* — Morgan, Lewis & Bockius LLP

(57) ABSTRACT

The present disclosure provides a battery module. The battery module comprises: a plurality of mono-batteries arranged along an arrangement direction; and a frame receiving and fixing the plurality of mono-batteries. The battery module further comprises a plurality of isolating plates, each isolating plate is interposed between two adjacent mono-batteries, each isolating plate is provided with a through hole penetrating along the arrangement direction. Each isolating plate is configured to be capable of self-foaming to make a volume of each isolating plate expanded when each isolating plate is heated and a temperature of each isolating plate is more than 200° C. When one mono-battery suffers thermal runaway, the through hole of each isolating plate can form air thermal resistance, thereby preventing heat generated by the runaway mono-battery from massively and quickly transferring to the large surfaces of the adjacent mono-batteries, so as to achieve the purpose of thermal isolation.

11 Claims, 4 Drawing Sheets

(51) Int. Cl.
*H01M 10/647* (2014.01)
*H01M 10/658* (2014.01)

(56) References Cited

U.S. PATENT DOCUMENTS

| | | | | |
|---|---|---|---|---|
| 2011/0206948 | A1* | 8/2011 | Asai | H01M 2/0473 |
| | | | | 429/7 |
| 2012/0316313 | A1* | 12/2012 | Emrick | C07D 249/06 |
| | | | | 528/128 |
| 2015/0221914 | A1 | 8/2015 | Page et al. | |
| 2017/0077468 | A1* | 3/2017 | Gerundt | H01M 2/1077 |

FOREIGN PATENT DOCUMENTS

| | | |
|---|---|---|
| CN | 102796283 A | 11/2012 |
| CN | 102838779 A | 12/2012 |
| CN | 203932256 U | 11/2014 |
| CN | 104852087 A | 8/2015 |
| CN | 106099184 A | 11/2016 |
| DE | 202013001662 U1 | 5/2013 |
| DE | 102013200546 A1 | 7/2014 |
| DE | 102015206182 A1 | 11/2015 |
| JP | 2016046163 A | 4/2016 |
| WO | WO-2014111364 A1 | 7/2014 |
| WO | WO-2014131649 A1 | 9/2014 |

OTHER PUBLICATIONS

Contemporary Amperex Technology Co. Limited, Communication Pursuant to Article 94(3) EP17194880.5, Feb. 27, 2019, 5 pgs.
Contemporary Amperex Technology Co., Limited, Extended European Search Report, EP17194880.5, dated Dec. 11, 2017, 7 pgs.
Contemporary Amperex Technology Co., Limited, First Office Action, CN201610910232.X, dated Feb. 6, 2020, 5 pgs.
Contemporary Amperex Technology Co., Limited, the First Office Action, CN201710624392.2, dated Feb. 3, 2020, 9 pgs.

* cited by examiner

BATTERY MODULE

CROSS-REFERENCE TO RELATED APPLICATIONS

The present application claims priority to Chinese patent application No. CN201610910232.X, filed on Oct. 19, 2016, which is incorporated herein by reference in its entirety.

FIELD OF THE PRESENT DISCLOSURE

The present disclosure relates to the field of battery, and particularly relates to a battery module.

BACKGROUND OF THE PRESENT DISCLOSURE

In existing structure of a battery module, a side plate has a composite structure consisting of aluminum alloy and an insulating membrane, adjacent mono-batteries directly contact with each other or space apart from each other via a compact plate (such as rubber pad, insulating plastic). When one mono-battery suffers thermal runaway, a temperature of the one mono-battery even reaches 500° C., at this time, heat generated by the one mono-battery may be massively transferred to mono-batteries adjacent to the one mono-battery respectively via adjacent compact plates and the side plate of metal (such as aluminum alloy), therefore the mono-batteries adjacent to the one mono-battery are also runaway. However, using an aerogel blanket to space apart the adjacent mono-batteries will cost too much.

SUMMARY OF THE PRESENT DISCLOSURE

In view of the problems existing in the background of the present disclosure, an object of the present disclosure is to provide a battery module, in which a through-hole of each isolating plate can form air thermal resistance, thereby preventing heat generated by one runaway mono-battery from massively and quickly transferring to large surfaces of mono-batteries adjacent to the runaway mono-battery, so as to achieve the purpose of thermal isolation.

In order to achieve the above object, the present disclosure provides a battery module, which comprises: a plurality of mono-batteries arranged along an arrangement direction; and a frame receiving and fixing the plurality of mono-batteries. The battery module further comprises a plurality of isolating plates, each isolating plate is interposed between two adjacent mono-batteries, each isolating plate is provided with a through hole penetrating along the arrangement direction. Each isolating plate is configured to be capable of self-foaming to make a volume of each isolating plate expanded when each isolating plate is heated and a temperature of each isolating plate is more than 200° C.

Compared to the prior art, the present disclosure has following beneficial effects: in the battery module of the present disclosure, the through-hole of each isolating plate can form air thermal resistance, because air has a low thermal conductivity, therefore the isolating plate of the present disclosure can prevent heat generated by the runaway mono-battery from massively and quickly transferring to the large surfaces of the adjacent mono-batteries, so as to achieve the purpose of thermal isolation. At the same time, when the temperature rises and the temperature of each isolating plate is more than 200° C., each isolating plate can self-foam so as to develop pores in the inside of each isolating plate, meanwhile, the volume of each isolating plate is expanded, thereby further increasing the air thermal resistance, preventing heat generated by the runaway mono-battery from transferring to the large surfaces of the adjacent mono-batteries, and avoiding the battery module from being runaway.

The battery module of the present disclosure is especially suitable for application in a power battery and an energy storage battery.

Figure 1:
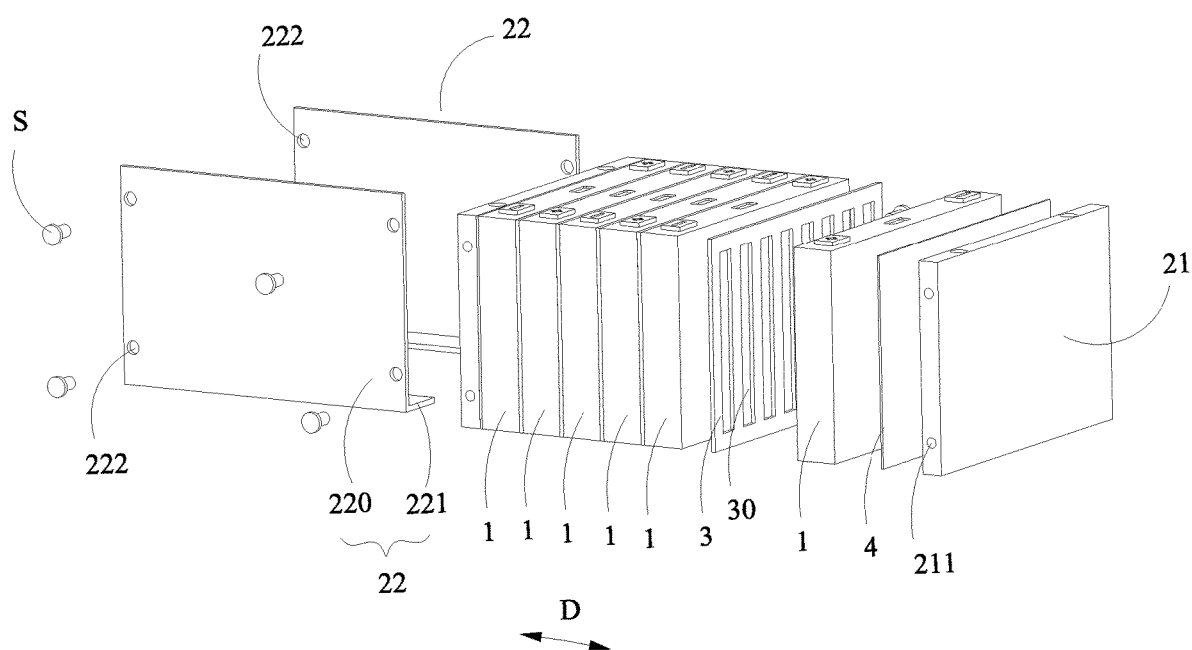
FIG. 1 is an exploded view of a battery module of the present disclosure.

The reference numerals are as follows:
1 mono-battery
2 frame
21 end plate
211 threaded hole
22 side plate
220 vertical portion
221 horizontal portion
222 mounting hole
3 isolating plate
4 insulating plate
S bolt
D arrangement direction

DETAILED DESCRIPTION

Hereinafter a battery module according to the present disclosure will be described in detail.

Referring to FIG. 1 to FIG. 6, a battery module according to the present disclosure comprises: a plurality of mono-batteries 1 arranged along an arrangement direction D; and a frame 2 receiving and fixing the plurality of mono-batteries 1. The battery module further comprises a plurality of isolating plates 3, each isolating plate 3 is interposed between two adjacent mono-batteries 1, each isolating plate 3 is provided with a through hole 30 penetrating along the arrangement direction D. Each isolating plate 3 is configured to be capable of self-foaming to make a volume of each isolating plate 3 expanded when each isolating plate 3 is heated and a temperature of each isolating plate 3 is more than 200° C.

Each isolating plate 3 won't self-foam under normal use (the temperature of each isolating plate 3 is not more than 200° C.), structural integrity of each isolating plate 3 is maintained and an interval between the two adjacent mono-batteries 1 is maintained. When one mono-battery 1 is runaway and the temperature rises, because air has a low thermal conductivity, the through hole 30 of the isolating plate 3 can form air thermal resistance, thereby preventing heat generated by the runaway mono-battery 1 from massively and quickly transferring to large surfaces of the mono-batteries 1 adjacent to the runaway mono-battery 1, so as to achieve the purpose of thermal isolation. At the same time, when the temperature rises and the temperature of each isolating plate 3 is more than 200° C., each isolating plate 3 can self-foam so as to develop pores in the inside of each isolating plate 3, meanwhile, the volume of each isolating plate 3 is expanded, thereby increasing the interval between the two adjacent mono-batteries 1, further increasing the air thermal resistance, preventing heat generated by the runaway mono-battery 1 from transferring to the large surfaces of the mono-batteries 1 adjacent to the runaway mono-battery 1, and avoiding the battery module from being runaway.

In the battery module according to the present disclosure, a main component of each isolating plate 3 is thermosetting resin which is capable of self-foaming to make a volume thereof expanded when heated. It should be noted that, "a main component of the isolating plate 3" means that in all components of the isolating plate 3, besides the thermosetting resin which is capable of self-foaming to make the volume thereof expanded when heated is included, other materials, for example conventional resin, polymer, inorganic filler and the like, can also be included. Of course, the isolating plate 3 may also only be consisted of the thermosetting resin which is capable of self-foaming to make the volume thereof expanded when heated.

In the battery module according to the present disclosure, the thermosetting resin is one selected from a group consisting of bisphenol-A cyanate ester resin (BCE), complex cyanate ester resin of phenol novolac cyanate ester and bisphenol-A cyanate ester and allyl compound modified bismaleimide resin.

In the battery module according to the present disclosure, the allyl compound may be allylphenol. Preferably, the allyl compound may be 2,2'-diallylbisphenol A (DABPA).

In the battery module according to the present disclosure, a compressive strength of each isolating plate 3 is larger than an expansion pressure of the mono-battery 1 adjacent to each isolating plate 3.

In the battery module according to the present disclosure, the compressive strength of each isolating plate 3 is 20 MPa-150 Mpa. When the compressive strength of each isolating plate 3 is 20 MPa-150 MPa, even if the mono-battery 1 adjacent to each isolating plate 3 is expanded, each isolating plate 3 won't be compressed, therefore the interval between the two adjacent mono-batteries 1 won't be decreased. Preferably, the compressive strength of each isolating plate 3 is 50 MPa-150 Mpa.

In the battery module according to the present disclosure, the through hole 30 may be provided as one or multiple in number. Preferably, the through hole 30 is provided as multiple in number.

In the battery module according to the present disclosure, a shape of the through hole 30 is not limited. Preferably, the shape of the through hole 30 is circular or rectangular.

In the battery module according to the present disclosure, a total plane area of the through hole 30 in each isolating plate 3 is 30%-80% of a total plane area of each isolating plate 3. The proportion of the total plane area of the through hole 30 in each isolating plate 3 is larger, heat transfer effect of each isolating plate 3 is worse, thermal isolation effect of each isolating plate 3 is better, but structural strength of each isolating plate 3 is also worse. Preferably, the total plane area of the through hole 30 in each isolating plate 3 is 60%-70% of the total plane area of each isolating plate 3. It should be noted that, "a total plane area of each isolating plate 3" refers to the total plane area of each isolating plate 3 before the through hole 30 is provided.

In the battery module according to the present disclosure, a thickness of each isolating plate 3 is 0.5 mm-5 mm. Preferably, the thickness of each isolating plate 3 is 2 mm.

In the battery module according to the present disclosure, each isolating plate 3 is the same as a large surface of the mono-battery 1 in both length and width.

In the battery module according to the present disclosure, when the battery module is under normal use, due to restriction of inherent characteristics of a material of each isolating plate 3, a porosity in the inside of each isolating plate 3 is close to 0, and generally is not more than 5%. When each isolating plate 3 is heated and the temperature of each isolating plate 3 is more than 200° C. and each isolating plate 3 has been self-foamed, the porosity in the inside of each isolating plate 3 is 10%-90%. It should be noted that, "a porosity in the inside of each isolating plate 3" refers to the porosity in the inside of a solid portion (that is a portion of each isolating plate 3 except the through hole 30) of each self-foamed isolating plate 3.

Figure 2:
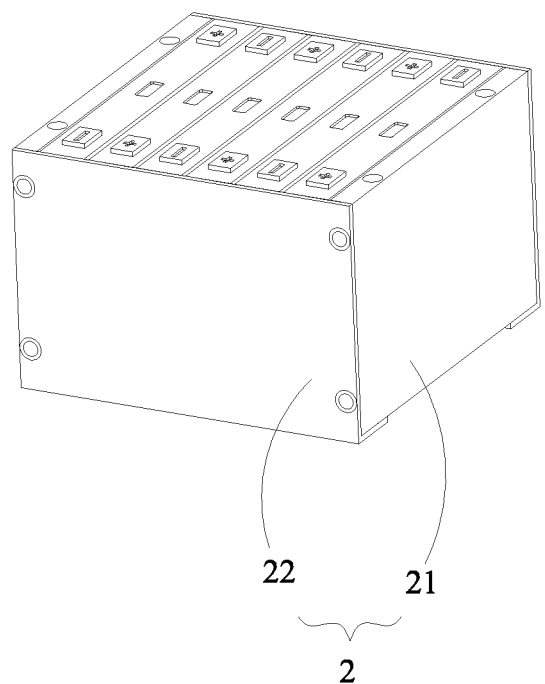
FIG. 2 is an assembled view of the battery module of FIG. 1.
Figure 3:
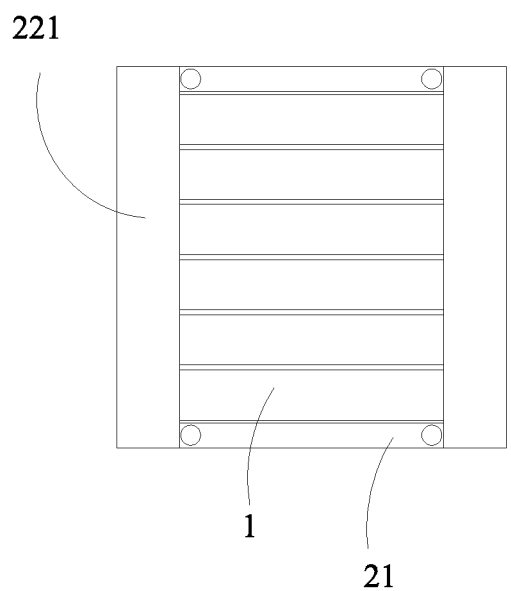
FIG. 3 is an assembled bottom view of the battery module of FIG. 2.
Figure 4:
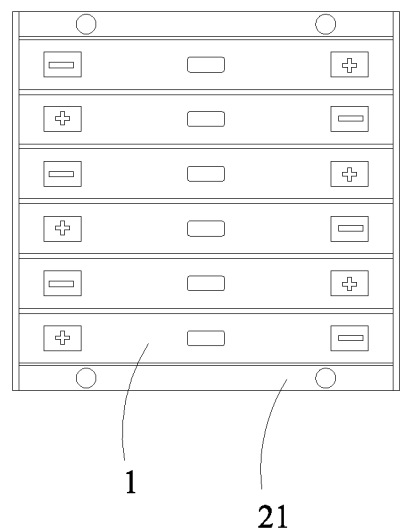
FIG. 4 is an assembled top view of the battery module of FIG. 2.

In the battery module according to the present disclosure, referring to FIG. 1 and FIG. 2, the frame 2 comprises: two end plates 21 respectively positioned at two ends of the plurality of the mono-batteries 1 along the arrangement direction D; and two side plates 22 respectively positioned at two sides of the plurality of the mono-batteries 1 and perpendicular to the two end plates 21, the two end plates 21 and the two side plates 22 are fixed together.

In the battery module according to the present disclosure, the two side plates 22 each are a L-type side plate. Referring to FIG. 1, each L-type side plate has a vertical portion 220 and a horizontal portion 221; the vertical portion 220 of each side plate 22 and the two end plates 21 are fixed together; the two horizontal portions 221 of the two L-type side plates are spaced apart from each other and contact and support the plurality of mono-batteries 1 and the two end plates 21 from below. The L-type side plate helps to form the air thermal resistance in a bottom surface of the battery module, so as to further prevent the heat of the runaway mono-battery 1 from massively and quickly transferring to the mono-batteries 1 adjacent to the runaway mono-battery 1 via the L-type side plate.

In the battery module according to the present disclosure, sum of contact areas between the two horizontal portions 221 of the two L-type side plates and the bottom portion of each mono-battery 1 is 5%-95% of the area of the bottom portion of each mono-battery 1. Preferably, sum of contact areas between the two horizontal portions 221 of the two L-type side plates and the bottom portion of each mono-battery 1 is 40% of the area of the bottom portion of each mono-battery 1.

In the battery module according to the present disclosure, the two vertical portions 220 of the two side plates 22 and the two end plates 21 are fixed together via bolts S and/or a structural adhesive.

Figure 5:
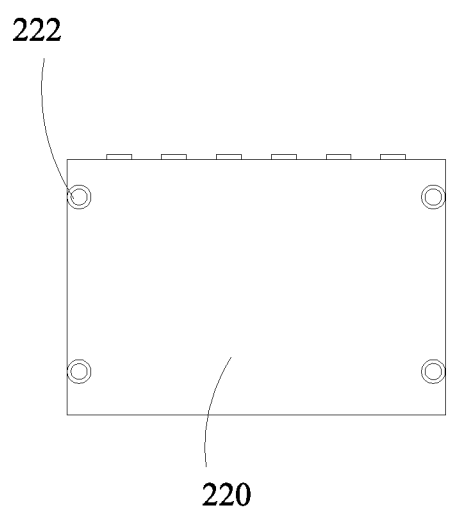
FIG. 5 is an assembled rear view of the battery module of FIG. 2.
Figure 6:
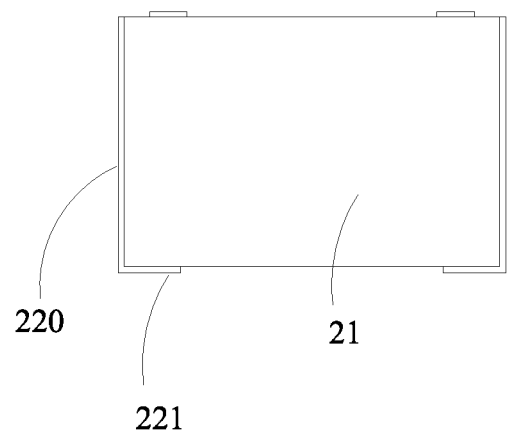
FIG. 6 is an assembled side view of the battery module of FIG. 2.

In the battery module according to the present disclosure, the vertical portion 220 of each side plate 22 is provided with a plurality of mounting holes 222; each end plate 21 is provided with a plurality of threaded holes 211 corresponding to positions of the plurality of mounting holes 222 of the two vertical portions 220 of the two side plates 22; each bolt S passes through the corresponding mounting hole 222 and is screwed into the corresponding threaded hole 211, therefore the two vertical portions 220 of the two side plates 22 and the two end plates 21 are fixed together. Referring to FIG. 1, FIG. 2 and FIG. 5, the number of the mounting holes 222 may be 4.

In the battery module according to the present disclosure, a distance from the mounting hole 222 to a corresponding side edge of the side plate 22 is not less than 4 mm. Preferably, the distance from the mounting hole 222 to the corresponding side edge of the side plate 22 is 5 mm-10 mm.

In the battery module according to the present disclosure, a thread depth of the threaded hole 211 is 3 mm-30 mm. Preferably, the thread depth of the threaded hole 211 is 5 mm-10 mm.

In the battery module according to the present disclosure, the structural adhesive is one or more selected from a group consisting of epoxy resin, acrylic acid and polyurethane. Preferably, the structural adhesive is acrylic acid.

In the battery module according to the present disclosure, a coating thickness of the structural adhesive is 0.2 mm-2 mm. Preferably, the coating thickness of the structural adhesive is 0.5 mm.

In the battery module according to the present disclosure, a thickness of each side plate 22 is 1 mm-5 mm. Preferably, the thickness of each side plate 22 is 2 mm.

In the battery module according to the present disclosure, a material of each of the two side plates 22 is fiber-reinforced thermosetting resin.

In the battery module according to the present disclosure, in the fiber-reinforced thermosetting resin, the fiber is one or more selected from a group consisting of glass fiber, carbon fiber, ceramic fiber and Kevlar fiber. Preferably, the fiber is glass fiber.

In the battery module according to the present disclosure, in the fiber-reinforced thermosetting resin, the fiber is one or more selected from a group consisting of chopped fiber, fibrous mat and fibrous fabric. Preferably, the fiber is fibrous fabric.

In the battery module according to the present disclosure, in the fiber-reinforced thermosetting resin, the thermosetting resin is one or more selected from a group consisting of cyanate ester resin, epoxy resin, epoxy vinyl ester resin and unsaturated polyester resin. Preferably, the thermosetting resin is epoxy vinyl ester resin.

In the battery module according to the present disclosure, a thermal conductivity of the fiber-reinforced thermosetting resin is not more than 0.5 W/(mK).

In the battery module according to the present disclosure, referring to FIG. 1, the battery module further comprises: two insulating plates 4 each provided between one end plate 21 and one mono-battery 1 adjacent to the one end plate 21.

Example 1

Length×width×thickness of each mono-battery was 150 mm×100 mm×2 mm, a nominal capacity of each mono-battery was 42 Ah, positive materials of each mono-battery were NCM, then the three mono-batteries were assembled as a 1P3S battery module, each isolating plate was made from allyl compound modified bismaleimide resin, and each isolating plate was provided with a plurality of penetrating through holes, a total plane area of the through holes in each isolating plate was 30% of a total plane area of each isolating plate. Nail penetration test was conducted on the battery module until a puncturing depth of the nail in the first mono-battery was 50% of a thickness of the first mono-battery.

The highest temperature of the first mono-battery was 500° C.

The explosion-proof vent of the second mono-battery was not opened, the voltage remained stable, and the highest temperature was not more than 249.6° C.

The highest temperature of the third mono-battery was not more than 60° C.

Comparative Example 1

Length×width×thickness of each mono-battery was 150 mm×100 mm×2 mm, a nominal capacity of each mono-battery was 42 Ah, positive materials of each mono-battery were NCM, then the three mono-batteries were assembled as a 1P3S battery module, each isolating plate was a compact plate made from silicone rubber (each isolating plate was not provided with the through hole penetrating along the up-down direction). Nail penetration test was conducted on the battery module until a puncturing depth of the nail in the first mono-battery was 50% of a thickness of the first mono-battery.

The highest temperature of the first mono-battery was 550° C.

The explosion-proof vent of the second mono-battery was opened after 11 min, then the voltage was down to 0 V, and the highest temperature was 580.5° C.

The explosion-proof vent of the third mono-battery was opened after 22 min, then the voltage was down to 0 V, the highest temperature was 600.2° C.

Comparative Example 2

Length×width×thickness of each mono-battery was 150 mm×100 mm×2 mm, a nominal capacity of each mono-battery was 42 Ah, positive materials of each mono-battery were NCM, then the three mono-batteries were assembled as a 1P3S battery module, each isolating plate was a compact plate made from allyl compound modified bismaleimide resin (each isolating plate was not provided with the through hole penetrating along the up-down direction). Nail penetration test was conducted on the battery module until a puncturing depth of the nail in the first mono-battery was 50% of a thickness of the first mono-battery.

The highest temperature of the first mono-battery was 542.3° C.

The explosion-proof vent of the second mono-battery was opened after 19 min, then the voltage was down to 0 V, and the highest temperature was 561.1° C.

The explosion-proof vent of the third mono-battery was opened after 37 min, the voltage was down to 0 V, the highest temperature was 564.5° C.

What is claimed is:

1. A battery module, comprising:
   a plurality of mono-batteries arranged along an arrangement direction; and
   a frame receiving and fixing the plurality of mono-batteries;
   wherein
   the battery module further comprises a plurality of isolating plates, each isolating plate is interposed between two adjacent mono-batteries, each isolating plate is provided with a through hole penetrating along the arrangement direction;
   each isolating plate is configured to be capable of self-foaming to make a volume of the isolating plate expanded when the isolating plate is heated and a temperature of the isolating plate is more than 200° C.; and
   a main component of each isolating plate is thermosetting resin which is capable of self-foaming to make a volume thereof expanded when heated, and the thermosetting resin is selected from allyl compound modified bismaleimide resin.

2. The battery module according to claim 1, wherein the allyl compound is 2,2'-diallylbisphenol A.

3. The battery module according to claim 1, wherein a compressive strength of each isolating plate is larger than an expansion pressure of the mono-battery adjacent to each isolating plate.

4. The battery module according to claim 1, wherein a compressive strength of each isolating plate is 20 MPa-150 Mpa.

5. The battery module according to claim 4, wherein the compressive strength of each isolating plate is 50 MPa-150 Mpa.

6. The battery module according to claim 1, wherein the through hole is provided as one or multiple in number.

7. The battery module according to claim 6, wherein the through hole is provided as multiple in number.

8. The battery module according to claim 1, wherein when each isolating plate is heated and the temperature of each isolating plate is more than 200° C. and each isolating plate has been self-foamed, a porosity in the inside of each isolating plate is 10%-90%.

9. The battery module according to claim 1, wherein the frame comprises:
    two end plates respectively positioned at two ends of the plurality of the mono-batteries along the arrangement direction; and
    two side plates respectively positioned at two sides of the plurality of the mono-batteries and perpendicular to the two end plates, the two end plates and the two side plates are fixed together;
    the two side plates each are a L-type side plate;
    each L-type side plate has a vertical portion and a horizontal portion;
    the vertical portion of each side plate and the two end plates are fixed together;
    the two horizontal portions of the two L-type side plates are spaced apart from each other and contact and support the plurality of mono-batteries and the two end plates from below.

10. The battery module according to claim 1, wherein a total plane area of the through hole in each isolating plate is 30%-80% of a total plane area of the isolating plate.

11. The battery module according to claim 10, wherein the total plane area of the through hole in each isolating plate is 60%-70% of the total plane area of the isolating plate.

* * * * *